(12) United States Patent
Purdum

(10) Patent No.: US 6,808,638 B1
(45) Date of Patent: Oct. 26, 2004

(54) METHODS AND APPARATUS FOR PROCESSING TEMPERATURE SENSITIVE MATERIALS

(75) Inventor: Howard E. Purdum, Alpharetta, GA (US)

(73) Assignee: Throwleigh Technologies, L.L.C., Ball Ground, GA (US)

( * ) Notice: Subject to any disclaimer, the term of this patent is extended or adjusted under 35 U.S.C. 154(b) by 0 days.

(21) Appl. No.: 09/805,770

(22) PCT Filed: Sep. 21, 1999

(86) PCT No.: PCT/US99/21836
§ 371 (c)(1),
(2), (4) Date: Jun. 25, 2001

(87) PCT Pub. No.: WO00/16872
PCT Pub. Date: Mar. 30, 2000

Related U.S. Application Data
(60) Provisional application No. 60/101,307, filed on Sep. 21, 1998.

(51) Int. Cl.[7] .............................. B01D 9/00; B01D 9/02; B01D 21/26; B01D 61/24
(52) U.S. Cl. ........................ 210/748; 210/645; 210/646; 210/739; 210/745; 210/746; 210/766; 210/774; 210/787; 210/806; 435/2
(58) Field of Search ................................. 210/645, 646, 210/739, 745, 746, 748, 766, 774, 787, 806, 656, 696, 782, 85, 86, 87, 97, 198.2, 175, 252; 435/2, 3; 604/4.01, 4.03, 403, 408; 62/344, 440

(56) References Cited

U.S. PATENT DOCUMENTS

| | | | |
|---|---|---|---|
| 4,156,645 A | * 5/1979 | Bray | 210/652 |
| 4,479,989 A | * 10/1984 | Mahal | 604/408 |
| 4,574,876 A | * 3/1986 | Aid | 165/46 |

(List continued on next page.)

FOREIGN PATENT DOCUMENTS

| | | |
|---|---|---|
| DE | 2 249 775 | 4/1973 |
| EP | 0 708 300 A1 | 4/1996 |
| EP | 0 765 605 A1 | 4/1997 |
| WO | WO 92/20420 | * 11/1991 |

OTHER PUBLICATIONS

A. P. Kapustin, "The Effects of Ultrasound on the Kinetics of Crystallization," Consultants Bureau, New York (1963).
A. Stemberger, et al., *Hoppe–Seyler's Z. Physiol. Chem. Bd.*, vol. 357, pp. 1003–1005 (1976).
J.M. Curling, *Methods of Plasma Protein Fractionation*, Academic Press, pp. 77–91 (1980).
P. Harrison, et al., *Thrombosis Research*, vol. 50, pp. 295–304 (1988).
Hardy, W.B., *Processing of the Royal Society of London*, vol. 112, pp. 47–61 (1926).
Soklov, I.T., *Journal of Technical Physics*, vol. 8, No. 10, pp. 901–902 (1938), (no translation).
Lock, G.S.H., "The growth and decay of ice", Cambridge University Press, Cambridge, pp. 305–308 (1990).

Primary Examiner—John Kim
(74) Attorney, Agent, or Firm—Oblon, Spivak, McClelland, Maier & Neustadt, P.C.

(57) ABSTRACT

A method and system (10) for selectively removing one component of a material thereby concentrating other components of the material are disclosed. The material is cooled to below the melting temperature of the material to form a supercooled liquid phase with heat transfer plate with cooling channels (20). Ultrasonic energy from ultrasonic drivers (42) is applied to the material to form solid phase crystals of the component to be removed. These crystals are removed to leave the concentrated products. The ultrasonic energy prevents the growth of dendrites on the crystals, resulting in the formation and removal of small crystals of the component to be removed without damage to or removal of the remaining components. Methods and apparatuses for cryoprecipilation and chromatography are also disclosed.

37 Claims, 5 Drawing Sheets

U.S. PATENT DOCUMENTS

| | | | |
|---|---|---|---|
| 4,780,212 A | | 10/1988 | Kost et al. |
| 5,021,663 A | * | 6/1991 | Hornbeck .................... 250/349 |
| 5,135,719 A | | 8/1992 | Hillman et al. |
| 5,139,496 A | * | 8/1992 | Hed ............................. 606/23 |
| 5,383,342 A | | 1/1995 | El-Boher et al. |
| 5,435,155 A | * | 7/1995 | Paradis ........................ 62/515 |
| 5,520,885 A | * | 5/1996 | Coelho et al. ............... 422/101 |
| 5,585,007 A | * | 12/1996 | Antanavich et al. ........ 210/782 |
| 5,833,861 A | | 11/1998 | Afeyan et al. |
| 5,880,265 A | | 3/1999 | Fischer et al. |
| 5,966,966 A | * | 10/1999 | Botsaris et al. ............. 210/748 |
| 6,397,661 B1 | * | 6/2002 | Grimes et al. ............. 73/24.06 |
| 6,436,454 B1 | * | 8/2002 | Cox et al. .................... 426/101 |
| 2003/0049245 A1 | | 3/2003 | Mann et al. |
| 2003/0059338 A1 | | 3/2003 | Mann et al. |
| 2003/0059920 A1 | | 3/2003 | Drohan et al. |
| 2003/0064000 A1 | | 4/2003 | Burgess et al. |

* cited by examiner

METHODS AND APPARATUS FOR PROCESSING TEMPERATURE SENSITIVE MATERIALS

This application claims priority to U.S. Provisional Patent Application Ser. No. 60/101,307, filed on Sep. 21, 1998.

BACKGROUND OF THE INVENTION

1. Field of the Invention

The present invention relates generally to a method and system for concentrating liquid materials. The invention relates more specifically to a method and system for selective removal of one or more components of a temperature-sensitive, multi-component material to form a product having an increased concentration of one or more other components of the material. The present invention further relates to methods and apparatus for processing temperature-sensitive materials, such as blood plasma. In particular, the present invention relates to methods and apparatus for concentrating temperature-sensitive materials, such as blood plasma, and for processing temperature-sensitive materials, such as blood plasma, by cryoprecipitation and/or chromatography.

2. Description of the Background

Plasma is the straw-colored liquid that remains after all of the cellular components of blood have been removed. Consisting of water, electrolytes, various nutrients, immune factors and clotting proteins, plasma has many life-supporting functions. For this reason, plasma is often used for direct transfusion, primarily for cases involving massive blood loss. Many of the individual components of plasma can also be separated and used to treat a variety of diseases, with more than 100 such products now being produced by a multi-billion dollar, worldwide industry.

Thus, there is an immense demand for plasma and plasma products. However, it is not possible to obtain enough material to meet these demands. Although there has been some success in various synthetic techniques, the main source of plasma and plasma products remains the human donor. The overall donation process begins at the collection center. At this point, plasma is either separated from a whole blood donation, or obtained by apheresis, a process that takes only the plasma component of the blood from the donor. Some of the plasma is then used for direct transfusion, and some of the plasma is frozen and then thawed to obtain cold temperature insoluble proteins called cryoprecipitates. Most of the collected plasma, though, is sent to central processing facilities, where it is combined into large vats from which the individual components are then separated.

It has been found desirable for a wide variety of reasons to concentrate one or more components of multi-component materials. For example, in the biomedical field, it is often desired to increase the concentration of materials such as blood constituents, including plasma, immunoglobulins, fibrinogen and/or clotting factors, by removing water and/or other components of the material. In the pharmaceutical field, concentration of drugs or other materials produced in dilute liquid form or in solution is often required to produce an effective or commercially viable product. Food products such as condensed milk are also produced by means of material concentration processes. Material concentration processes also find application in the chemical processing industry, for example, in the removal of water from aqueous solutions, in the removal of organic solvents such as alcohols or alkanes from organic solutions, and the removal of inorganic solvents such as acids from in organic solutions. The concentrated materials may be reconstituted for use by addition of water, saline solution or other materials, or may be used or further processed in concentrated form.

Concentration of a material may be desirable in order to minimize the expense and space requirements related to storage and transportation of the material. For example, the storage and shipment of blood products typically requires expensive refrigeration equipment. The effective capacity of available equipment can be increased by minimizing the volume of the shipped or stored products through material concentration. Increased availability of blood products can save lives in emergency situations such as natural disaster or war, and can provide substantial economic savings in non-emergency applications. Concentration of a material may also be desirable in order to enhance or alter the properties or therapeutic effects of the material. For example, fibrin glue formed by concentration of fibrinogen and other components in blood plasma has found increasing application in the repair of traumatized biological tissue. The concentration of a material also may assist in, or enhance the efficiency of, additional processing of the material. For example, concentration of blood plasma reduces the volume of material to be treated in subsequent decontamination and fractionation steps, thereby reducing the time, expense and equipment requirements for these processes. Material concentration can also enhance the detection of contaminants in a product by increasing the concentration of the contaminants, thereby rendering them more easily detectable.

Previously known material concentration methods have been found to be less than fully successful for many applications. In particular, temperature-sensitive materials are often damaged by known material concentration methods. For example, forced evaporative and distillation methods of concentration, which typically involve the application of heat to the material to be concentrated, can irreversibly denature proteins or otherwise damage the product. Previously known cryoprecipitation methods of concentration, which typically involve freezing the entire quantity of material to be concentrated, can likewise damage temperature-sensitive products. Previously known filtration methods of material concentration typically suffer inefficiencies due to clogging of the filter media, necessitating frequent replacement or cleaning of the filter. Previously known methods and systems for concentrating also suffer from low yields and inefficiencies. For example, pump and line losses often consume a substantial quantity of concentrate in known methods and systems.

Thus it can be seen that a need yet exists for a method and system for concentrating temperature-sensitive materials, which method reduces or eliminates damage to the materials, reduces inefficiencies and increases yield.

It is also known to separate some proteins from blood plasma by cryoprecipitation. The basic principle of cryoprecipitation is that some plasma proteins agglomerate when frozen, and then remain agglomerated when thawed if the temperature is kept sufficiently low, no more than 5° C. This technique can thus be used to separate certain proteins, such as Factor VIII, fibrinogen, and von Willebrands factor, from bulk plasma.

Conventional cryoprecipitation techniques, however, suffer from long processing times and poor yields; these limits are indeed some of the prime motivations for the concentrator. It is therefore desirable to develop a cryoprecipitation technology specifically for concentrated plasma.

It is also known to separate and/or purify materials by chromatography. The underlying principle in chromatography is that different materials diffuse through different media at different rates. These differences in rates thus provide a means of separating the various components of complicated mixtures. Such separations are commonly used to identify individual components, such as toxins or other unknowns, and to prepare commercially valuable fractions of known mixtures, such as blood plasma.

In conventional chromatography, the target materials of interest are often organic compounds, which can be in liquid or gaseous forms. The target materials are usually dissolved in a solvent, such as alcohol. The media typically consist of absorbing materials, such as paper or gels.

The overall process amounts to a progression of equilibrium states (K. Hostettmann et al, *Preparative Chromatographic Techniques*, Springer Verlag, 1998, which is incorporated herein by reference), during which the material to be separated reaches equilibrium with the media and the solvent. The ideal situation is that the flow rates and the relative absorption strengths are balanced well enough to resolve the components.

There are, however, four major factors that act against these ideal conditions. First, the sample may be so large that the starting conditions are not well defined, i.e., part of the sample may be subject to solvent motion, while the rest of the sample sees no treatment, Second, molecular diffusion of the solute under the action of the increasing concentration gradient tends to spread the material in all directions. Third, eddy diffusion due to irregularities in the media can also spread the solute in all directions. Fourth, the resistance of the media to mass transfer can hinder local equilibration. The net effect of these, and other lesser factors, is to spread the components (i.e., the components migrate as broad, possibly overlapping bands as opposed to narrow, resolved bands), thereby reducing the resolution of the system.

To overcome these problems, a number of alternatives are available. These techniques, which include the use of high pressure, rotation, ion exchange, affinity, etc., are often quite successful, but are expensive, complicated, and require long processing times. These problems are particularly severe for high molecular weight components, such as blood plasma proteins.

Nevertheless, chromatography is still the preferred technique for isolating plasma proteins. Compared to the older, but still practiced, Cohn, or cold ethanol, fractionation procedure, chromatography yields greater resolution and less protein damage. For these reasons, new facilities, such as the Australian national unit, are designed for chromatography. Even in this state-of-the-art facility, however, the process is still quite involved and lengthy. For example, a given batch of plasma requires approximately 3 months for complete processing. This very long time is in fact the underlying problem behind recent shortages of various immunoglobulins in the United States, shortages so severe that FDA has relaxed some safety standards.

Thus, there also remains a need for improved chromatography techniques for the separation and/or purification of materials, in particular temperature-sensitive materials such as blood plasma.

SUMMARY OF THE INVENTION

Thus, it is one object of the present invention to provide novel systems for processing temperature-sensitive materials.

It is another object of the present invention to provide novel systems for processing blood plasma.

It is another object of the present invention to provide novel systems for concentrating temperature-sensitive materials.

It is another object of the present invention to provide novel systems for concentrating blood plasma.

It is another object of the present invention to provide novel containers for concentrating temperature-sensitive materials.

It is another object of the present invention to provide novel containers for concentrating blood plasma.

It is another object of the present invention to provide novel methods for concentrating temperature-sensitive materials.

It is another object of the present invention to provide novel methods for concentrating blood plasma.

It is another object of the present invention to provide novel apparatus for separating and/or purifying materials by cryoprecipitation.

It is another object of the present invention to provide novel apparatus for separating and/or purifying blood plasma by cryoprecipitation.

It is another object of the present invention to provide novel methods for separating and/or purifying materials by cryoprecipitation.

It is another object of the present invention to provide novel methods for separating and/or purifying blood plasma by cryoprecipitation.

It is another object of the present invention to provide novel apparatus for separating and/or purifying materials by chromatography.

It is another object of the present invention to provide novel apparatus for separating and/or purifying blood plasma by chromatography.

It is another object of the present invention to provide novel methods for separating and/or purifying materials by chromatography.

It is another object of the present invention to provide novel methods for separating and/or purifying blood plasma by chromatography.

These and other objects, which will become apparent during the following detailed description, have been achieved by the inventor's discovery that materials, in particular temperature-sensitive materials such as blood plasma, comprising at least a first component and a second component, may be concentrated to form a product having an increased concentration of one of the first and second components by a method comprising:

(a) cooling at least a portion of the material to a temperature at or below the melting point of the material, said portion containing the first component in liquid phase;

(b) applying ultrasonic energy to at least the cooled portion of the material to form a system comprising a solid phase and a liquid phase, wherein said solid phase comprises said first component; and (c) collecting said solid phase.

The inventor has also discovered that materials, in particular temperature-sensitive materials such as blood plasma, comprising at least a first component and a second component, may be concentrated to form a product having an increased concentration of one of the first and second components by a system comprising:

(a) a heat transfer device for cooling at least a portion of the material to a temperature at or below the melting point of the material, said portion containing the first component in liquid phase;

(b) an ultrasonic energy source for applying ultrasonic energy to at least the cooled portion of the material to form a system comprising a solid phase and a liquid phase, wherein said solid phase comprises said first component; and (c) means for collecting said solid phase.

The inventor has also discovered that materials, in particular temperature-sensitive materials such as blood plasma, comprising at least a first component and a second component, may be concentrated to form a product having an increased concentration of one of the first and second components by a container comprising:

(a) a flexible wall portion enclosing a treatment chamber for allowing heat transfer between an external heat transfer device and the material, and allowing ultrasonic energy transmission from an external energy source into the material;

(b) a collection chamber for collecting a removed portion of the first component; and (c) a product chamber for collecting the product.

The inventor has also discovered that blood plasma concentrates may be processed by a process comprising:

(a) cooling a blood plasma concentrate to a temperature sufficient to form a system comprising a solid phase and a liquid phase; and (b) collecting said solid phase.

The inventor has also discovered that blood plasma may be processed by a process comprising:

(a) cooling at least a portion of blood plasma and applying ultrasonic energy to at least the cooled portion of said blood plasma, to form a system comprising a solid phase and a liquid phase; and (c) collecting said solid phase.

The inventor has also discovered that blood plasma concentrates may be processed by using a container comprising:

(a) a flexible wall portion enclosing a treatment chamber for allowing heat transfer between an external heat transfer device and the blood plasma, and allowing ultrasonic energy transmission from an external energy source into the material;

(b) a collection chamber for collecting a liquid phase; and (c) a product chamber for collecting a solid phase.

The inventor has also discovered that materials, in particular temperature-sensitive materials such as blood plasma, comprising at least a first component and a second component, may be separated into their constituent components and/or purified by a method of chromatography, which comprises:

(a) eluting said material through a stationary phase, while supplying ultrasonic energy ultrasonic energy transmission from an external energy source to the material.

The inventor has further discovered that materials, in particular temperature-sensitive materials such as blood plasma, comprising at least a first component and a second component, may be separated into their constituent components and/or purified by a chromatographic apparatus, which comprises:

(a) a container suitable for eluting said material through a stationary phase and allowing ultrasonic energy transmission from an external energy source into the material; and (b) an external ultrasonic energy source.

Briefly described, in preferred form, the present invention comprises a method and system for concentrating materials.

The method and system of the present invention are particularly suited to the concentration of temperature-sensitive materials, but can also be utilized for the concentration of materials that are not temperature-sensitive. According to the preferred forms of the present invention described in greater detail herein, the method and system of the present invention are applied to concentrate a material comprising at least a first component and a second component. At least a portion of the first component of the material is removed to form a product having an increased concentration of the second component, relative to the concentration of the second component in the initial material. The method and system of the present invention are applicable to concentration of materials including, without limitation: biological materials such as plasma, and/or other blood constituents; pharmaceuticals; chemicals; laboratory testing diagnostics; and food products.

One aspect of the invention provides a method of concentrating a solution or other material comprising at least a first component and a second component, to form a product having an increased concentration of one of the components. The method preferably comprises cooling at least a portion of the material to a temperature at or below the melting point of the solution, said portion containing the first component in liquid phase. The method preferably further comprises applying ultrasonic energy to at least the cooled portion of the material to form crystals of the first component in solid phase. The method preferably also comprises removing the crystals from the material to form the concentrated product. The product can be the material remaining after removal of the crystals and having an increased concentration of the second component or, conversely, can be the removed crystals having an increased concentration of the second component.

In another aspect, the present invention comprises a system for concentrating a material comprising at least a first component and a second component, to form a product having an increased concentration of one of the components. The system preferably includes a heat transfer device for cooling at least a portion of the material to a temperature at or below the melting point of the material, said portion containing the first component in liquid phase. The system preferably also includes an ultrasonic energy source for applying ultrasonic energy to at least the cooled portion of the material to form crystals of the first component in solid phase. The system preferably also includes means for collecting the crystals from the material to form the product. The product can be the material remaining after removal of the crystals and having an increased concentration of the second component or, conversely, can be the removed crystals having an increased concentration of the second component.

In another aspect, the present invention comprises a container for containing a quantity of material during separation of a first component from the material to form a first product having an increased concentration of the first component and a second product having an increased concentration of a second component of the material. The container preferably comprises a flexible wall portion enclosing a treatment chamber for allowing heat transfer between an external heat transfer device and the material, and allowing ultrasonic energy transmission from an external energy source into the material. The container preferably further comprises a collection chamber for collecting a removed portion of the first product. The container preferably also comprises a product chamber for collecting the second product.

The system and method of the present invention may find application in a number of fields, for example: concentration of biological materials such as plasma and other blood constituents; concentration of pharmaceuticals; concentration of chemicals; concentration of laboratory test specimens to increase recognition of low concentration components; and concentration of food products.

BRIEF DESCRIPTION OF THE DRAWINGS

These and other features and advantages of preferred forms of the present invention are described herein with reference to the drawing figures.

DETAILED DESCRIPTION OF THE PREFERRED EMBODIMENTS

Concentration Method

Thus, in a first embodiment, the present invention provides a method of concentrating a material comprising at least a first component and a second component, to form a product having an increased concentration of one of the first and second component, said method comprising:

(a) cooling at least a portion of the material to a temperature at or below the melting point of the material, said portion containing the first component in liquid phase;

(b) applying ultrasonic energy to at least the cooled portion of the material to form a system comprising a solid phase and a liquid phase, wherein said solid phase comprises said first component; and (c) collecting said solid phase.

The present method enables the concentration of solutions and other materials, including temperature-sensitive materials, according to an ultrasound assisted freezing method. The ultrasound assisted freezing method of the present invention comprises processing a material having at least a first component and a second component, by removing at least a portion of the first component to form a product having an increased concentration of the second component. The method comprises cooling at least a portion of the material to a temperature at or below the melting point of the solution, thereby forming a supercooled liquid phase. This cooling step can be carried out by operation of the heat transfer device described in more detail below. Ultrasonic energy is applied to at least the cooled portion of the material to induce formation of a solid phase (nucleation of crystals, in the case of many materials) of the first component. Application of ultrasonic energy to supercooled liquids has been found to promote crystal formation. The application of ultrasonic energy can be carried out by operation of the ultrasonic energy source described in more detail below. These crystals of the first component are then removed from the material, forming a first product having an increased concentration of the first component, and leaving a second product having an increased concentration of the second component. The removal of crystals can be carried out by operation of the collecting means described in more detail below.

Although the present concentration method is described in terms of forming a solid phase, for many types of materials the solid phase will exists as crystals. While this is true for water, some solids may precipitate as amorphous forms (note vitrification) or as poorly defined crystalline solids. Thus the present method is not limited only to those materials that form readily identifiable crystals, such as ice. Accordingly, the present concentration method includes other "solids" or "precipitates" which are formed as a result of lowering the temperature of the material.

Figure 1:
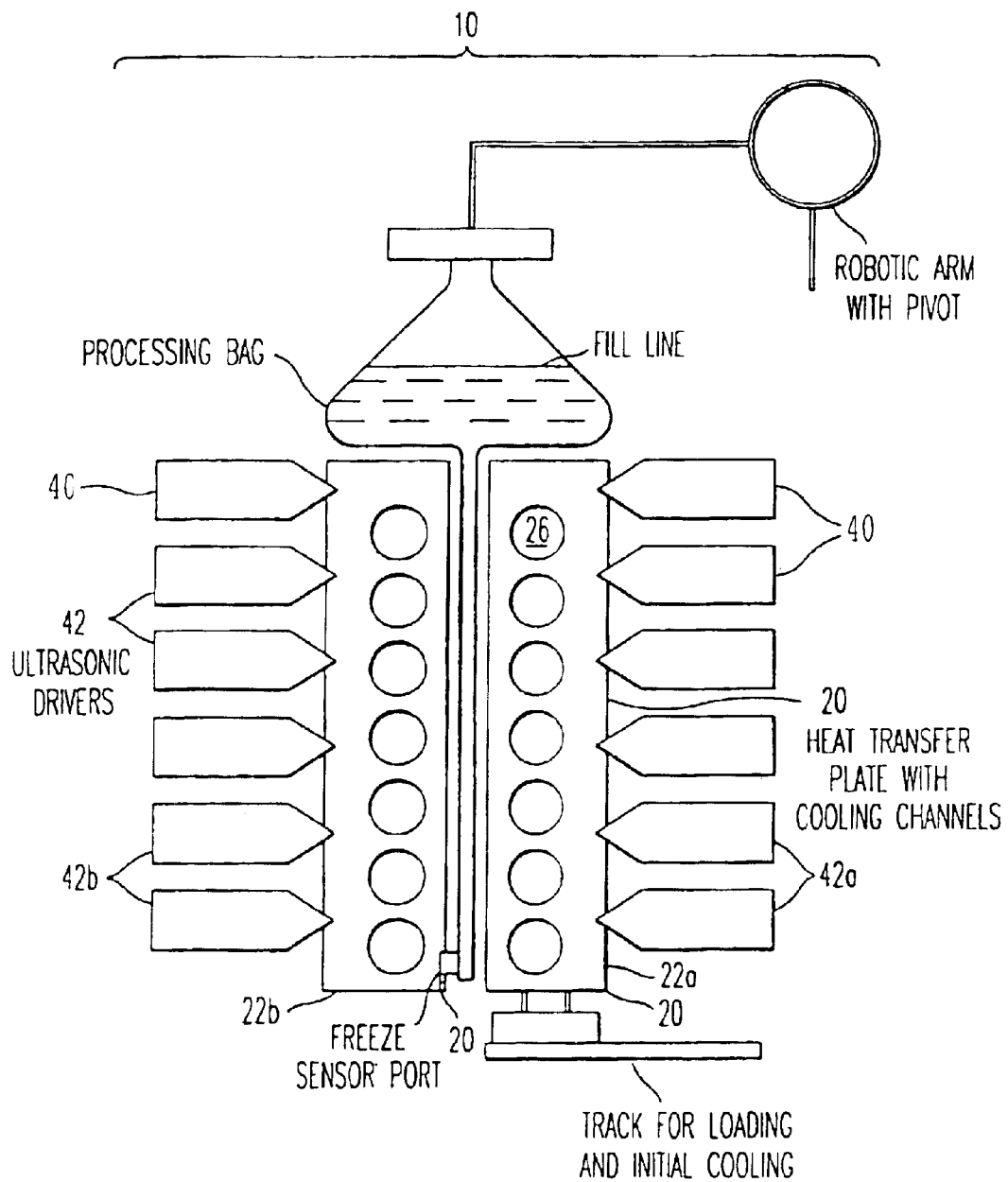
FIG. 1 shows a perspective view of a preferred embodiment of the system of the present invention.

The cooling step and the step of applying ultrasonic energy can be separately carried out using separate equipment, or can be coupled by mounting ultrasonic transducers on cooling means such as the cooling plates 22 shown in FIG. 1 to form sonified cooling plates. By passing the material to be concentrated adjacent to a sonified cooling plate, simultaneous cooling and application of ultrasonic energy is achieved. Still more preferably, a thin layer of the material to be concentrated can be positioned between first and second cooling plates, at least one of which is a sonified cooling plate, to increase heat transfer and crystal formation.

The term "melting point," as used herein, means the temperature at which a material changes from its solid phase to its liquid phase as heat is absorbed by the material. This temperature will vary depending upon the composition of the material, and can be experimentally determined for given materials. Given an infinite time and an adequate nucleation site, the "freezing point" (the temperature at which a material will transform from liquid to solid phase as heat is removed from the material) is equal to the melting point. In actual practice, however, the freezing point of a material is nearly always somewhat below its melting point. Material remaining in liquid phase at a temperature below its melting point is termed "super-cooled" material. A discussion of the freezing mechanism is provided in U.S. Pat. No. 5,139 496 to Hed, which is incorporated by reference herein.

The temperature to which the material to be concentrated is cooled will vary, depending upon the composition of the material and its components, and can be determined by routine experimentation. For example, if the material to be concentrated is an aqueous material and the component to be removed is water, the material may be cooled to 0° C. or below. More preferably, the aqueous material may be cooled to between −1 to −0.5° C, and most preferably to approximately −0.5° C. Plasma is preferably concentrated by initially cooling to approximately −1° C. As the concentration of a material increases, its melting point will drop, requiring progressive cooling to lower temperatures as the material is further concentrated. In this manner, the material is maintained in a slightly super-cooled state, only a few degrees below its instant melting point. This ensures that ice crystals remain small and incipient dendrites break off, thereby preventing the entire volume of material from freezing.

The ability of ultrasound to cause nucleation and accelerated ice crystal growth is largely independent of frequency. It is also largely independent of power in the range of cavitation, and at least 50% below the onset of measurable cavitation. (I. T. Sokolov, "Effects of Ultrasonics on Supercooled Water," Zh. Tekh. Fiz., vol. 8, p. 901 (1938), which is incorporated herein by reference.

Thus, in regard to frequency, the present method may employ ultrasonic energy provided by the existing technology. Commercial technology (Sonics and Materials, Inc., Danbury, Conn.) emphasizes 20 kHz and 40 kHz units, where 20 kHz is slightly above the range of human hearing. Such frequencies are suitable for use in the present method.

As for power, the object is to stay just below the level of cavitation. Cavitation refers to the local pressure becoming less than the vapor pressure, causing the formation of gas bubbles. It is commonly observed behind boat propellers. In ultrasound practice, cavitation is employed for jewelry cleaners, the acceleration of chemical reactions, and the destruction of cell membranes. For blood plasma, strong cavitation should be avoided because it will damage the plasma proteins. On the other hand, sufficient sonification is necessary to cause nucleation and crystal growth. Furthermore, the degree of cavitation depends upon the viscosity of the liquid, with an upper limit of about 8,000 to 10,000 cp (centipoise). Because the plasma will start with a viscosity much less than this limit, and then exceed this limit as the plasma becomes more concentrated, a feedback circuit is used to control the power level to the ultrasonic generator. Such feedback circuits are well known and are commercially available from Sonics and Materials, Inc., Danbury, Conn. For low viscosity materials, such as human plasma, the initial intensity should preferably not exceed 1 Watt/cm$^2$.

Ultrasound has three influences on crystal growth: it initiates this growth by providing nucleation sites, it then accelerates this growth and it influences the purity of the resulting crystals.

The theory of freezing is well described in any introductory chemistry textbook (Leonard W. Fine, *Chemistry*, Appleton Century Crofts, New York, 1972). The basic concept is that heat can be removed continuously from a liquid, such as pure water, with a corresponding decrease in the temperature of the liquid, until the freezing point is reached and the liquid begins to become a solid. At this point, the temperature remains constant while the remaining liquid solidifies as additional heat is removed. This additional heat is known as the heat of fusion. Upon completion of the solidification step, any further removal of heat results in a decrease in the temperature of the solid. Conversely, the addition of heat to a solid raises the temperature of the solid until the melting point is reached. At this point the temperature remains constant until the heat of fusion is added to the system, turning all of the remaining solid into a liquid. Any subsequent addition of heat then simply raises the temperature of the liquid.

Except for ideal conditions and infinite time periods, however, the freezing point and the melting point are not the same. Instead, the freezing point is typically significantly lower than the melting point because of two competing thermodynamic processes, the decrease in free energy in the system as the heat of fusion is released and the increase of free energy in the system as surface energy is absorbed. These processes compete at small, isolated freezing sites called nuclei. The result of this competition is that nuclei above a critical minimum size are stable and grow into ice crystals, while smaller nuclei are reabsorbed into the melt because they are thermodynamically unstable. Thus, for a liquid to freeze, the temperature must be below the melting point and stable freezing nuclei must be present.

Without these nuclei, further removal of heat results in a supercooled liquid, which is a liquid that is colder than its melting point. Supercooled liquids are thus quite unstable and will freeze rapidly if nuclei are provided, experiments with pure water indicating a freezing time of about 20 msec (D. R. Worsnop et al., "Heterogeneous Reaction Kinetics of Importance to Stratospheric Chemistry", Aerodyne Research Report No. ARI-RR-613, 1988). Because of their inherent instability, supercooled liquids can also freeze on nuclei provided externally. This process, called heterogeneous nucleation, typically occurs on rough wall surfaces or solid impurities. Lacking any nuclei whatsoever, a supercooled liquid can be chilled to its homogeneous solidification point, where freezing occurs without a nucleation surface. For pure water, the homogeneous freezing point is accepted as −40° C.

The freezing of aqueous solutions, however, is significantly more complicated than the freezing of pure water. Specifically, the solutes, such as salt or other electrolytes, depress the freezing point by blocking the formation of the ice crystal lattice until the temperature becomes low enough that the crystal can displace the solutes. The net result is the growth of quite pure ice crystals, along with an increase in the solute concentration. This increased concentration, in turn, further depresses the freezing point, yielding even greater solute concentrations. With continuous removal of heat, this process continues until no more liquid remains, which is referred to as the eutectic point At temperatures below this point, either salt hydrates or separate salt and ice crystals form.

The conditions described above, however, hold only for essentially equilibrium processes, a condition that is often not met in nature. Instead, localized heating and cooling can produce instabilities in the advancing freeze front, or ice crystal growth face. With these instabilities, rapidly progressing freeze fronts can jump over locally high concentrations of solutes to freeze in more dilute zones, thereby trapping the solutes in concentrated pools (W. B. Hardy, *Proc. Roy. Soc, Lond. A.*, vol. 112, p. 47 (1926)). This phenomenon is commonly observed as inclusions in the dendrites, or branches, of the advancing freeze front. Another important non-equilibrium process is vitrification, in which the freeze concentration curve essentially extends below the eutectic point. In this region, the unstable solution becomes highly viscous and the available energy does not favor crystallization, thus yielding a glass. With sufficiently rapid heat removal, even equilibrium intermediate states are effectively bypassed, the net result being an amorphous solid (G. S. H. Lock, *The Growth and Decay of Ice*, Cambridge University Press, Cambridge, 305–308, 1990).

Ultrasound can accelerate crystal growth by factors of 50 to 100 or even more. The mechanism behind this effect is that ultrasound reduces the effective viscosity of the fluid, improves diffusion, breaks up boundary layers, and improves heat transfer within the fluid. Ultrasound also breaks off the branches of advancing dendrites, thus providing new nucleation sites while preventing the inclusion of pockets of dissolved impurities (A. P. Kapustin, *The Effects of Ultrasound on the Kinetics of Crystallization*, Consultants Bureau, New York, 1963).

Finally, ultrasound also breaks up wall ice, thereby preventing the growth of an insulating layer between the cooling plates and the liquid to be treated. This is critical for the rapid treatment of plasma.

The main use of ultrasound in cold biological systems is cryosurgery, primarily intended for neurology, cardiology and dermatology. The best patent example is provided by Hed (A. Z. Hed, "Ultrasonic Freeze Ablation Catheters and Probes," U.S. Pat. No. 5,139,496). The only other uses are simple laboratory cell wall destruction processes.

In the present method, the entire system is super-cooled only slightly, to avoid the above-discussed zone jumping and rapid dendrite growth traping part of the plasma proteins in the rapidly forming ice matrix. Next ultrasound is applied to generate nucleation sites throughout the treatment zone between the heat transfer plates. This continuous application will ensure that any super-cooled liquid will begin to freeze almost instantly, again ensuring product purity by preventing the inclusion of solutes. This continuous sonification will also ensure uniform mixing of the material, with uniform cooling. Ice buildup on the walls will also be prevented, due to boundary layer breakup and continued agitation. Finally, those crystals that are formed will rapidly reach the critical size required for stability, and then quickly float out of the treatment zone due to reduced viscosity. Again, this later growth will occur without dendrite trapping or zone jumping, thus yielding high purity.

The concentration limit is imposed by the eutectic phenomenon mentioned above. In the case of plasma, however, the eutectic is not a single point, but a range extending from about −5 to −30° C. This means that the ice will be essentially pure, thus yielding ideal concentration, from the plasma freezing point of approximately −0.5° C. to about −5° C. This limit thus provides for several concentration factors before the solutes are included in the ice matrix.

A significant enhancement, however, is to use dialysis to remove the salts from the progressively more concentrated solution. Salt removal is targeted because the salts determine the overall freezing behavior of the solution, with the proteins, sugars, fats, etc., exerting much less influence. Also, at high concentrations the salts can actually poison the reactive sites of the proteins and induce cross links that denature the proteins. Removal of the salts during the freezing process thus allows more water to be removed without exceeding the eutectic limit, while also protecting the plasma proteins. Very high concentrations can thus be reached, the limit being the ability of the system to handle a material with the consistency of a paste; note that many plasma products are supplied in paste form.

The solid crystalline particles of the first component can be removed from the material by skimming, filtering or otherwise collecting and separating the crystals from the material. Alternatively, if a concentration container as described herein is provided, the crystals can be collected in a collection chamber of the concentration container for removal. In further alternate embodiments, the crystals can be removed by centrifuging or other mechanical separation means, chemical separation processes, and/or electromagnetic separation processes.

The method of the present invention optionally can further comprise a variety of sampling and testing steps. For example, the method can comprise determining the concentration of various components of the product; measuring the resistivity, viscosity, light transmissivity, temperature, pH, and/or other characteristics of the processed material; and/or detecting the presence of contaminants in the processed material. Also, because the melting point of many materials will decrease as the concentration increases, the concentration of the material can be determined based on the observed temperature at which crystals form. The method of the present invention optionally can further comprise product treatment, such as for example, removing salts or other constituents from the concentrated product during or after concentration through a dialysis membrane.

Cooling of the material to be processed in combination with the application of ultrasonic energy according to the present invention achieves a number of unexpected results. For example, applied ultrasonic energy enables crystal formation at selected locations throughout the entire volume of a quantity of the material, rather than only at the surface of the material. The application of ultrasonic energy also vibrationally excites the crystals to limit the growth of dendrites from the crystals, or break off any incipient dendrites that may form. The prevention or minimization of dendrite formation helps insure that only pure crystals of the first component are removed from the material, and that no other components of the material are trapped within dendrites and removed with the crystals. The application of ultrasonic energy to the material also is believed to reduce the viscosity of the material, thereby allowing crystals of the first material to more quickly float to the surface of the material, or otherwise collect for removal. The application of ultrasonic energy also is believed to enhance the rate of heat transfer within the material, thus providing faster and more uniform cooling throughout the entire volume of a quantity of material. Placement of the ultrasonic transducers on the cooling plates to form sonified cooling plates has the additional advantage of preventing ice build-up in the material adjacent the cooling plates, which ice build-up may form an insulating layer resisting heat transfer from the material to the cooling plates.

Concentration System

In a second embodiment, the present invention provides a system for concentrating a material comprising at least a first component and a second component, to form a product having an increased concentration of one of the first and second components, said system comprising:

(a) a heat transfer device for cooling at least a portion of the material to a temperature at or below the melting point of the material, said portion containing the first component in liquid phase;

(b) an ultrasonic energy source for applying ultrasonic energy to at least the cooled portion of the material to form a system comprising a solid phase and a liquid phase, wherein said solid phase comprises said first component; and (c) means for collecting said solid phase.

The concentration system will be described in more detail by referring to the drawing figures, wherein like reference numerals represent like parts throughout. FIG. 1 shows a system 10 for concentrating a component of a material according to a preferred form of the present invention. The system 10 generally comprises one or more heat transfer devices 20 for cooling the material to be concentrated, one or more ultrasonic energy sources 40 for applying ultrasonic energy to the material to be concentrated, and means for collecting crystallized particles of a component of the material. The system 10 optionally can further comprise transfer means for transporting the material for processing within the system 10. These and other features of the system 10 of the present invention are described in greater detail below.

The one or more heat transfer devices 20 are placed in thermal contact with the material to be concentrated, and absorb heat from the material to cool the material. The capacity and operating temperatures of the one or more heat transfer devices 20 will vary depending on the type and quantity of material to be concentrated. The heat transfer devices 20 cool the material to be concentrated to a temperature at or below the melting point of the solution at the instant concentration.

The one or more heat transfer devices 20 preferably comprise at least one cooling plate 22 for absorbing heat from the material to be concentrated. In more preferred form, the one or more heat transfer devices 20 comprise a first cooling plate 22a and a second cooling plate 22b, allowing the material to be concentrated to be sandwiched in a thin layer between the first and second cooling plates 22a, 22b for faster heat transfer. The cooling plates 22a, 22b are preferably fabricated of a material having high thermal conductivity, such as aluminum, copper, or stainless steel. The one or more heat transfer devices 20 preferably further comprise a refrigeration unit (not shown) of standard design, and refrigerant conduits 26 for communicating refrigerant between the refrigeration unit and the cooling plates 22a, 22b. The one or more heat transfer devices 20 of the present invention are selected to enable super-cooling of at least those components of the material to be removed by the system 10 to form the concentrated product.

The system 10 of the present invention further comprises one or more ultrasonic energy sources (not shown), for applying ultrasonic energy to at least that portion of the material to be concentrated which is cooled by the heat transfer device 20. The ultrasonic energy source preferably comprises an ultrasonic transducer 42, such as a piezoelectric transducer, for generating ultrasonic energy. The one or more ultrasonic energy sources 40 preferably apply ultrasonic energy to the material to be concentrated at the same frequency and power density discussed above in the context of the concentration method. In a preferred embodiment, a transducer 42 is mounted on a cooling plate 22 of the heat transfer device 20, to provide a sonified cooling plate permitting simultaneous cooling and application of ultrasonic energy to at least a portion of the material to be concentrated. In a still more preferred form, a first ultrasonic transducer 42a is mounted on the first cooling plate 22a, and a second ultrasonic transducer 42b is mounted on the second cooling plate 22b, thereby permitting simultaneous cooling and application of ultrasonic energy to opposed surfaces of the material to be concentrated.

The system 10 of the present invention preferably further comprises means for collecting a crystallized component from the material to form a concentrated product according to the method described herein. The means for collecting can take any of a number of forms. For example, a skimmer or separator can collect solid crystalline particles from the top or bottom of the material. Alternatively, if a concentration container as described herein is provided, the means for collecting comprises a collection chamber of the concentration container. In further alternate embodiments, the means for collecting can comprise a filter clement, a centrifuge or other mechanical separation means, chemical separation processes, and/or electromagnetic separation processes.

The system 10 of the present invention may further comprise transfer means for transporting the material for processing within the system 10. If provided, the transfer means may serve to pass at least a portion of the material to be concentrated along the surface of the one or more cooling plates 22 into position for heat transfer, and/or into position for application of ultrasonic energy from the one or more ultrasonic energy sources. For example, in a preferred embodiment, the transfer means passes the material to be processed between first and second cooling plates 22a, 22b comprising first and second ultrasonic transducers 42a, 42b. Alternatively or additionally, the transfer means may acquire individual containers of material to be concentrated, such as the concentration container described herein, and sequentially feed containers through the system for processing. The transfer means can comprise a pump, gravity feed system, or other continuous transfer mechanism; and/or can comprise one or more mechanical actuators such as vacuum or friction grippers, conveyors or robotic transfer arms for transferring individual containers of material.

The system 10 of the present invention optionally can further comprise a variety of sampling and testing devices. For example, the system can comprise one or more sensors for determining the concentration of various components of the product. For example, sensors can be provided for measuring the resistivity, viscosity, light transmissivity, temperature, pH, and/or other characteristics of the processed material. The system can further comprise means for detecting the presence of contaminants in the processed material. Contaminants to be detected may include biological organisms such as viruses or bacteria, other disease-transmission vectors such as prions, particulate foreign maker such as dust or debris, etc.

The system 10 of the present invention optionally can further comprise product treatment means. The product treatment means may comprise, for example, a dialysis membrane for removing salts or other constituents from the concentrated product during or after concentration.

Concentration Container

In a third embodiment, the present invention provides a container for containing a material during separation of a first component of the material to form a product having an increased concentration of a second component of the material, said container comprising:

(a) a flexible wall portion enclosing a treatment chamber for allowing heat transfer between an external heat transfer device and the material, and allowing ultrasonic energy transmission from an external energy source into the material;

(b) a collection chamber for collecting a removed portion of the first component; and (c) a product chamber for collecting the product.

Figure 2:
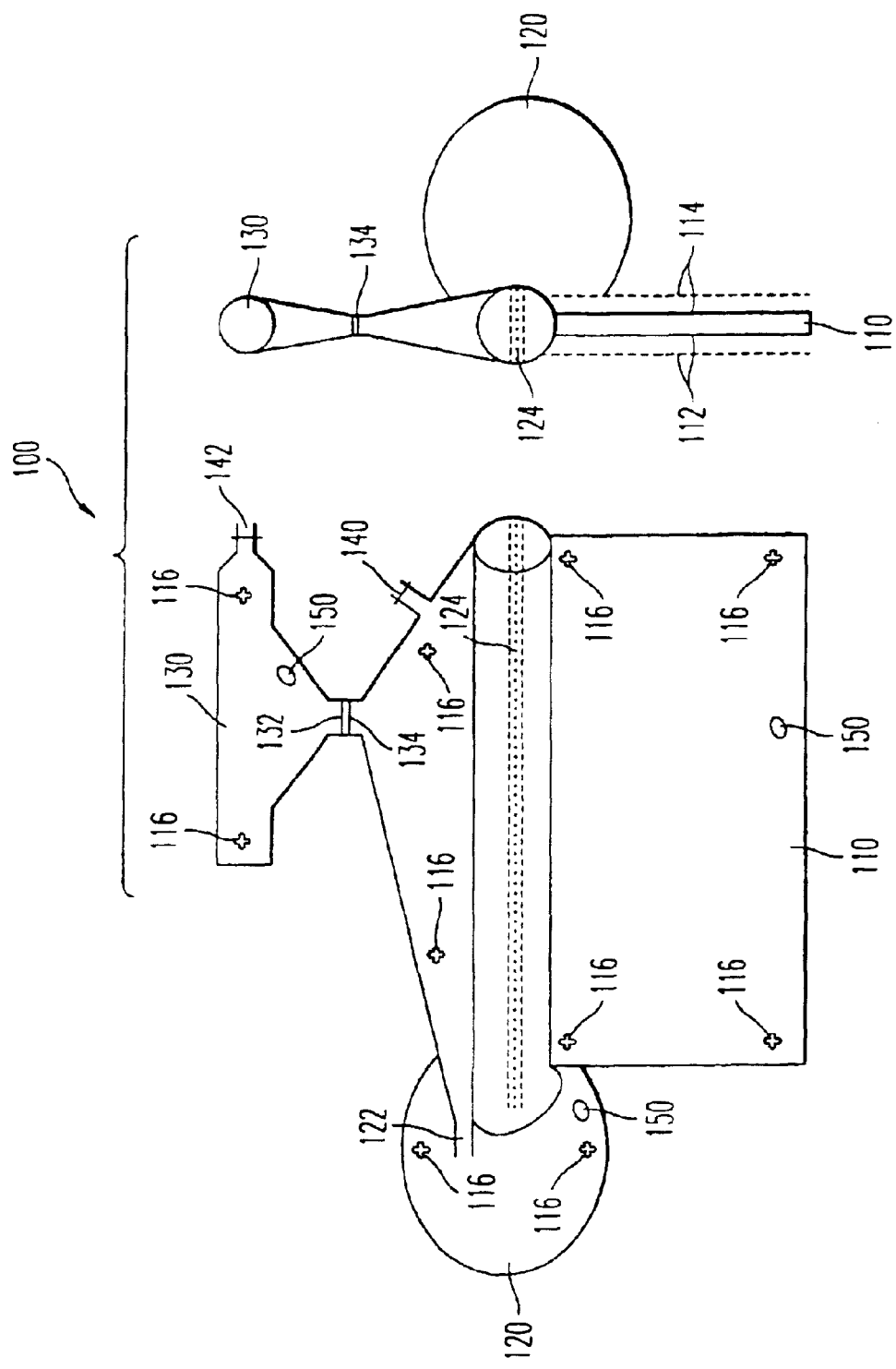
FIG. 2 shows a first embodiment of a container for concentrating materials according to a preferred form of the present invention.
Figure 3:
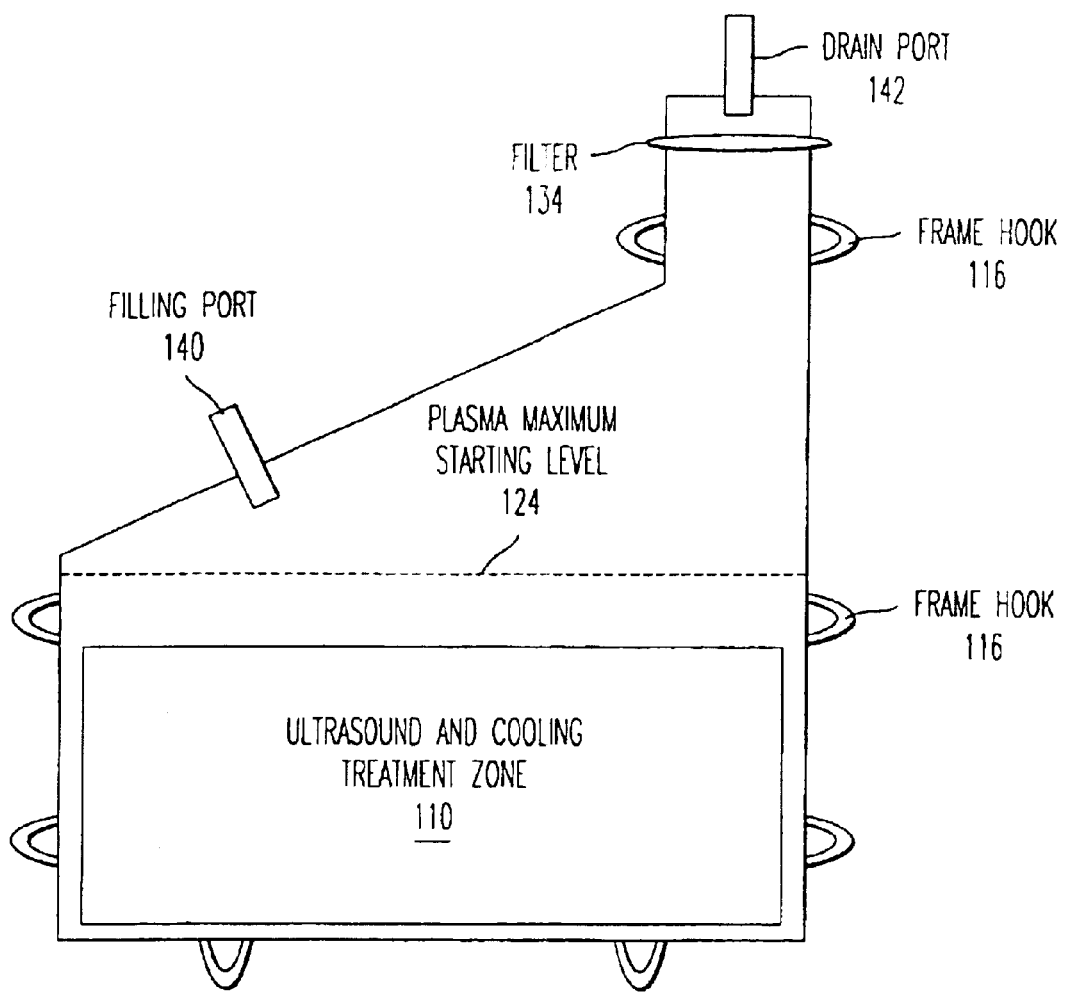
FIG. 3 shows a second embodiment of a container for concentrating materials according to a preferred form of the present invention.

The method and system of the present invention are greatly facilitated through the use of a concentration container for containing an individual quantity of material to be concentrated and processing that quantity of material within the concentration container using the method and system described herein. Embodiments of the present concentration container are shown in FIGS. 2 and 3. As shown in FIG. 2, the concentration container 100 of the present invention preferably comprises a multi-chambered, thin-walled, flexible container including a treatment chamber 110, a collection chamber 120, and a product chamber 130. The treatment chamber 110 preferably is bounded by movable chamber walls 112, 114, and is relatively thin in order to promote heat transfer and ultrasonic energy transfer through material therein. The chamber walls 112, 114 are preferably fabricated from a flexible bio-compatible material such as polyethylene or other plastic film, which is compatible and non-reactive with the material to be processed, and which retains its flexibility at 1 ov temperatures. One or more reinforced anchor points 116 can be provided for engagement by the transfer means and/or by the cooling plates 22. Anchor points 116 can also be provided for securing the container 100 in place in a plastic frame or other rigid support device.

The collection chamber 120 preferably communicates with the upper portion of the treatment chamber 110, so that as crystals of the component to be removed from the material are formed, the crystals float to the top of the material and can be skimmed or otherwise transferred through a collection port 122 into the collection chamber 120. The level 124 of material initially provided in the concentration container 100 is preferably just below the level of the collection port 122, to prevent unprocessed material from overflowing into the collection chamber 120.

The product chamber 130 is preferably arranged above the treatment chamber 110, and communicates with the treatment chamber 110 through a product transfer port 132. A filter element 134 can be provided in the product transfer port 132 to trap the solid phase. The concentration container 100 is preferably provided with a re-closeable and sealable material inlet fitting 140 for introducing the material to be processed into the treatment chamber, and a re-closeable and sealable product collection fitting 142 for collecting or sampling the concentrated product from the product chamber 130. The material inlet fitting 140 and the product collection fitting 142 preferably comprise sterile docks for sterile material transfer.

One or more sensors 150 can be provided at various positions on the concentration container 100, to monitor characteristics of the materials therein and/or to detect the presence or concentration of constituents or contaminants. Additionally, one or more product treatment means, such as for example, dialysis membranes, can be provided at various positions on the concentration container 100.

The essential goal in this design is simplicity, avoiding the tubes, attached bags, etc., which are used even in conventional apheresis or other plasma processing equipment. There are two reasons for this arrangement. Simplicity is beneficial because it reduces the cost and set-up problems of the system. Simple systems also avoid residual losses in either the tubing or the auxiliary bags, which is critical because of the high intrinsic value of the concentrate.

As another part of this goal of overall simplicity, there is no pump in the system. In addition to avoiding material losses, pumps should be avoided in the present system, because the ice crystals would block any tubing, damage the pumping mechanism, and contaminate the product with crushed ice.

Simplicity is also implicit in the single, molded plastic processor bag design. One advantage to this approach is that single piece construction reduces manufacturing costs. Single piece construction also yields a device that can be easily and quickly mounted into the processor. Single piece units can also be readily sealed for gamma sterilization, with sterile docks at the access ports providing complete processing in a closed environment as per FDA regulations.

Single piece units can also be adapted for multiple concentration cycles, which are necessary for many applications, including human plasma. Specifically, normal blood plasma contains about 150 mg/dl (milligrams/deciliter) of fibrinogen. Frozen, high quality fibrin glues, however, have fibrinogen concentrations at least 10 times greater than bulk plasma levels, and up to 100 times greater for lyophilized products. Such concentrations would correspond to a crystallized mixture consisting of essentially only ice, thus leaving at most only about 10% fluid. Unfortunately, such an arrangement would not be possible because there would be inadequate fluid to float the ice crystals thereby resulting in system failure. The present concentration method avoids this problem by removing the residual ice during each cycle.

Concentration System Operation

The system can be run in two different operating modes, depending upon the particular application. The simpler and more obvious approach is to arrange the components in sequential order for continuous processing. Under this approach, bulk material is continuously fed in at the inlet, and final product is continuously removed, with the degree of concentration depending directly on the number of steps employed. Of course, processing single batches at a time through a sequence of components its an extension of this technique, as would be used to prepare small samples for diagnostic testing. This overall approach is thus appropriate for pharmaceuticals, chemicals, diagnostic specimens, and other units for which cross-contamination is not a problem; this technique can also be applied to pooled plasma if donor selection and/or appropriate inactivation techniques are used to control the risks of infection.

Conversely, the system can also be arranged to process single plasma donor units, thus avoiding the problems associated with large pools. The resulting concentrate can then be transfused directly, reconstituted for transfusion, or shipped to component manufacturers.

Under this approach, there are several different techniques to introduce the plasma into the system, but all of these techniques share the same crystallization and filtration steps. This distinction follows directly from the daily operations of the plasma collection center itself. Specifically, the plasma may be obtained from apheresis equipment, or from centrifugation of whole blood. The distinction between these two options is that apheresis volumes can be on the order of 700 ml, while whole blood derived plasma volumes are on the order of 200 ml. In addition, the plasma may be warm from immediate collection, or already cooled to preserve Factor V and other labile components.

The major differences are thus volume and temperature. Volume can be accounted for by using bags of different sizes, cooling plates of different sizes, and/or repeated cycles with bags and plates of the same sizes.

Temperature differences can be overcome by several different options. All of the plasma can be brought to a relatively uniform temperature by prolonged refrigerated storage. This technique is appropriate for after-hours or separate facility processing. Alternatively, the plasma can be passed through a set of cooling plates before introduction into the processing bag, thus ensuring a uniform entrance temperature. This technique is appropriate for direct coupling to the apheresis equipment, producing a concentrate essentially at the completion of the apheresis process. Finally, warm plasma can be introduced directly into the processing bag, and subsequently cooled within the processor. This technique is appropriate for those facilities where immediate processing is not necessary, but after-hours or concurrent processing is difficult due to staff or space limitations.

As noted above, two embodiments of the container (disposable bag) used to achieve these results are illustrated in FIGS. 2 and 3. To avoid activation of the clotting sequence, these bags are made of the same plastics used for conventional plasma bags. Also like conventional bags, access is provided through standard docking ports, which can accept hollow needles or sterile coupling devices.

Unlike conventional bags, however, these bags have a port on their side. This port is used to fill the bag with plasma concentrate, after which the port is then permanently heat sealed using conventional equipment and practices. Also unlike conventional bags, this bag has hooks for attaching it to a rigid frame, which can be readily grasped by a robotic arm.

After filling, the frame is then placed by the robotic arm into the concentration chamber, where the plasma is cooled and subjected to ultrasound, as discussed earlier. The result of this process is thus a mixture of ice and concentrated plasma.

The robotic arm then removes the frame from the processing chamber, and rotates it 90 degrees so that the filling port is on the top and the plasma is pooled along the longest side. The robotic arm then places the frame in a centrifuge with the filter and drain end pointing outward. In this configuration, the liquid and ice mixture are well below the inlet port so that no material can become inadvertently lodged around the port; furthermore, the filter is thus directly exposed to the full pressure head of the liquid column under centrifugation.

Centrifugation then traps the ice crystals in the bag while forcing all of the remaining liquid out of the bag through the filter. This filter consists of a nylon mesh mounted in a sleeve that is heat sealed to the inner walls of the bag, thereby ensuring a secure, stable attachment. The concentrated plasma then passes through this filter and into an attached collection bag.

The type of collection bag depends upon the needs of the particular user. The simplest option is to collect the concentrate in a conventional plasma bag for direct transfusion, storage, or shipment to a fractionator. This option is thus for users who wish to maintain the plasma in a condition as near as possible to its original state, less some water, and do no further processing. Another option is to collect the plasma in a dialysis bag for subsequent removal of excess salt; this option provides a higher quality product due to reduced saline poisoning. With or without dialysis, the next option is to collect the plasma in a bag designed for cryoprecipitation, as described in the following section. The final option is to collect the plasma in another concentration chamber for repeated concentration, with or without dialysis. Several combinations of these options are possible, and are selected by assembling the appropriate bags and programming the controller.

After centrifugation, the controller then activates the robotic arm to lift the frame out of the centrifuge and place it into the previously selected next module, where any desired additional processing can then be done in the dialysis and/or the concentration modules.

Finally, after all such processing is completed, the frame is then placed in the sealer/cutter, which first heat seals the connecting tubing and then cuts across this seal to separate the final concentrate container from the processing bags. The resulting concentrate can then be transfused, stored, or processed further, depending upon the needs of the individual user. The bags are then discarded and the frame is cleaned for later use.

The overall process thus amounts to developing a system that is simple to build and operate. Construction of the system therefore centers about a simple disposable for individual plasma units, and simple, sequential components for batch usage. Operation is simplified by performing repeated, standardized crystallization and ice removal steps. The overall result is an inexpensive, highly efficient process for concentrating heat sensitive materials.

System dimensions: To achieve the optimum results, the system is most preferably properly sized for adequate heat transfer and uniform sonification. For single donor, whole blood derived plasma, suitable treatment zone dimensions are about 10 cm high, 30 cm long, and 0.05 mm thick, corresponding to a volume of about 15 cc. These dimensions leave room for multiple concentration steps if desired, and provide for the required heat transfer and sonification. For apheresis applications, the same bag can be used, or a bag twice as high or twice as long (but not both) can be used to account for the higher volume; the thickness must remain the same.

d. Applications of Concentrate

In addition to easier shipping, handling, decontamination, cryoprecipitation and fractionation, there are other, new applications for the present concentration system. One such application is to enhance the speed and effectiveness of new plasma exchange technologies that remove only some components of a patient's plasma and then return the remainder. A second application is direct transfusion of the concentrate without dilution. This approach has the potential of achieving all of the benefits of plasma transfusion, without the clinical concern of water overload. This approach thus has immense promise in reversing warfarin effects, as well as for treating massive trauma or burn victims.

Cryoprecipitation a. Cryoprecipitation of Plasma Concentrate

In another embodiment, the present invention provides a method for processing a blood plasma concentrate comprising:

(a) cooling a blood plasma concentrate to a temperature sufficient to form a system comprising a solid phase and a liquid phase; and (b) collecting said solid phase.

Although simple in practice, this technique is nevertheless conceptionally unobvious. The main problem is that the cryoprecipitation proteins are found in different proportions in different plasma units, depending on the body chemistry of the individual donor.

The net result is that there is a great deal of variation in cryoprecipitate yields. For example, plasma from an individual with a normal fibrinogen level of about 150 mg/dl can produce several ml of cryoprecipitate. Likewise, another individual also with a fibrinogen level of 150 may produce more or less cryoprecipitate, depending on the relative levels of Factor VIII, etc., but there will probably not be a great deal of difference. On the other hand, plasma from an individual with a low fibrinogen level of 75 mg/dl may produce virtually no measurable cryoprecipitate, which is not nearly half the volume produced from the 150 mg/dl cases. Conversely, plasma from an individual with a high fibrinogen level of over 300 mg/dl can produce much more than twice the amount of cryoprecipitate as that produced at the 150 mg/dl level.

Even more important from a clinical standpoint, however, is the variability in strength of fibrin glue made from these cryoprecipitates. These glues, which are a mixture of cryoprecipitate and thrombin, are used for wound approximation and hemostasis. Wide variations in cryoprecipitate quality, however, make the product quite unpredictable.

In addition, there is also the matter of plasma preparation and treatment. Specifically, holding plasma for 24 hours at low temperature without agitation increases the yield of cryoprecipitates. Alternatively, repeating the freeze thaw process (the University of Alabama-Birmingham procedure) yields more cryoprecipitate, and higher strength fibrin glue, for a given unit of plasma. On the other hand, removing the cryoprecipitate after the first cycle and then attempting cryoprecipitation on the "cryoreduced" plasma yields essentially no product. Finally, flash freezing plasma in small tubes dropped in −80° C. ethanol also yields no cryoprecipitate. For comparison, note that the conventional technique produces roughly equivalent yields whether the plasma is slow frozen in a conventional bag and freezer or "blast frozen" using special bags and a fan. In either case, the material that will eventually form the cryoprecipitate is located in the core of the container.

All of these observations can be explained in terms of plasma protein concentration. Specifically, cryoprecipitation requires that the proteins collide and then agglomerate. Thus, at higher concentrations, the proteins are closer together, and therefore collide more frequently, which in turn yields more agglomeration. Conversely, at lower concentrations, the likelihood of collision is reduced and the yields are correspondingly lower.

The above noted yield variations from different donors follow immediately. That is, the average 150 mg/dl sample produces an average yield. On the other hand, the 75 mg/dl sample proteins are too far apart to yield many useful collisions: there is thus a threshold effect such that essentially no product is formed at this low concentration, instead of half the product of the 150 mg/dl sample.

As for the observation that the 300 mg/dl sample yields much more than twice the cryoprecipitate obtained from the 150 mg/dl sample, note that the likelihood of collision is a three dimensional effect relative to concentration. For example, consider a single protein molecule that is subject to cryoprecipitation. In a uniform distribution, other similar molecules at an average radial distance r surround this molecule. Concentrating the plasma by a factor of 8 cuts this average distance in half to r/2, thereby significantly improving the chance of an agglomerating collision. In addition, increasing the concentration by a factor of 8 also increases the target area between the molecules by a factor of 4, again increasing the likelihood of a productive collision.

The net effect is that once the molecules are sufficiently close to start agglomerating collisions, the likelihood of these collisions, and the corresponding product yield, increases rapidly with increasing concentration.

Having thus accounted for the yield variations with respect to concentration, the next concern is the variation in glue strength. An analysis of clot strength as a function of fibrinogen concentration yields the relation $F_b = \alpha C_f^2$, where $F_b$ is the bonding strength, $\alpha$ is a proportionality constant, and $C_f$ is the fibrinogen concentration. Qualitatively, this relation follows because the number of binding sites depends on the concentration, and the bonding area varies as a squared term. The net result is that the bonding strength is strongly dependent on the fibrinogen concentration, and different glues from different plasmas thus have greatly different properties.

The plasma preparation and treatment observations also illustrate the magnitude of this concentration effect. Specifically, holding the plasma at low temperatures over prolonged time periods allows for partial agglomeration from Brownian motion collisions. The result is that partial concentration occurs before freezing. Although this small change in local concentration produces a significant increase in yield, this process is, however, not widely used due to time constraints and concentration gradient limits.

As for the repeated freeze/thaw cycles, the cryoprecipitate formed during the first cycle acts as freezing nuclei for subsequent cycles. Progressively less yield is obtained on each cycle, however, because less free material is available in the residual plasma, and even less of this material is sufficiently close to the existing nuclei to agglomerate. Note that disrupting or melting the nuclei at any cycle thus decreases the subsequent yield; this effect is apparently irreversible to the approximately 10% or more damage that occurs to the proteins during each freezing step. Similarly, removing the cryoprecipitate after the first freeze leaves no nuclei for any subsequent steps, which then fail because they are done on cryoreduced plasma that is essentially below the threshold concentration.

Finally, this leaves the matter of the flash frozen versus conventionally frozen plasma. Flash freezing, although widely used to preserve small plasma samples for diagnostic testing, fails to produce cryoprecipitate because the freeze process occurs so rapidly that the solutes are not sufficiently concentrated to collide and agglomerate. Conversely, slower freezing results in progressively higher concentrations towards the center of the sample, thus resulting in cryoprecipitation mainly in the sample core.

It thus follows that concentration is a critical factor in cryoprecipitation. As such, performing cryoprecipitation on concentrated plasma produces much higher yields than those obtained from normal plasma. In addition, the use of a concentrated starting material ensures that any given plasma sample is well within the threshold required for effective cryoprecipitation, thus removing much of the variability of conventional single donor preparations. Note that the elimination of this variability is commonly cited as a justification alone for the use of pooled plasma products.

As noted above, concentrated plasma alone improves the yield. Also as noted above, the cryoprecipitation process itself concentrates the plasma to a certain degree. On the other hand, the plasma from the concentrator is already at or near the eutectic limit. This limit, however, is actually a range extending from −5 to −30° C., not a single point.

The net result is that there are several processes occurring in the plasma as it freezes. Furthermore, much of the material is not well mixed, leading to local chemical potential instabilities and various other non-equilibrium conditions. Although these factors cannot be directly controlled, they can be at least partially managed by applying the ultrasound techniques described in the concentrator section. Excessive super-cooling can thus be avoided, along with the resulting dendrite traps and concentration zone jumps. The yield is thus improved by achieving whatever concentration improvements may be had. In addition, the earlier elimination of excess salt ensures that the concentrated proteins will not be nearly as poisoned as they are by conventional techniques, thereby yielding a higher quality product.

As for process speed, great improvements follow immediately from the reduced volume of the plasma concentrate, compared to normal plasma. Because the limiting factor in cryoprecipitation is the removal of the latent heat of fusion of water, less volume means less heat must be removed. The freezing process for concentrates is thus much faster than the freezing process for normal plasma. In addition, the reduced volume allows the use of much thinner samples, thus also increasing the processing speed. The limiting factor here is the core, which freezes quite slowly because the latent heat of the remaining liquid must be removed from a progressively thicker layer of insulating ice; thinner samples have thinner cores and thus freeze very much more rapidly than thicker samples.

b. Ultrasonic Assisted Cryoprecipitation

In another embodiment, the present invention provides a method for processing blood plasma comprising:

(a) cooling at least a portion of blood plasma and applying ultrasonic energy to at least the cooled portion of said blood plasma, to form a system comprising a solid phase and a liquid phase; and (c) collecting said solid phase.

The use of ultrasound also increases the speed by improving the rate of heat transfer; see the earlier discussion on enhanced mixing, wall ice break up, and the growth of ice crystals within the bulk. The net effect is an increase in processing speed of at least a factor of 30, even for conservative estimates.

The ultrasound equipment used and the power and frequency of ultrasonic energy applied in this embodiment are the same as those described above, in the context of the concentration method discussed above.

It should also be noted that even with these enhancements, there may still be .some benefit of a 24 hour standing time.

c. Cryoreduced Plasma

With the present cryoprecipitation method, the cryoprecipitates can thus be removed quickly and effectively. While these are significant benefits, it is important to note that the residual material is now a quite pure, highly concentrated mixture of the plasma proteins that do not cryoprecipitate, notably albumin and the various immunoglobulins. Compared to conventional cryoreduced plasma, this concentrate thus has much less cryoprecipitate contamination and is already in a quite concentrated form. As such, it is thus ideal for the various Cohn and/or chromatography fractionation industries.

d. System Design

In another embodiment, the present invention provides a container for processing blood plasma comprising:

(a) a flexible wall portion enclosing a treatment chamber for allowing heat transfer between an external heat transfer device and the blood plasma, and allowing ultrasonic energy transmission from an external energy source into the material;

(b) a collection chamber for collecting a liquid phase; and (c) a product chamber for collecting a solid phase.

Figure 4:
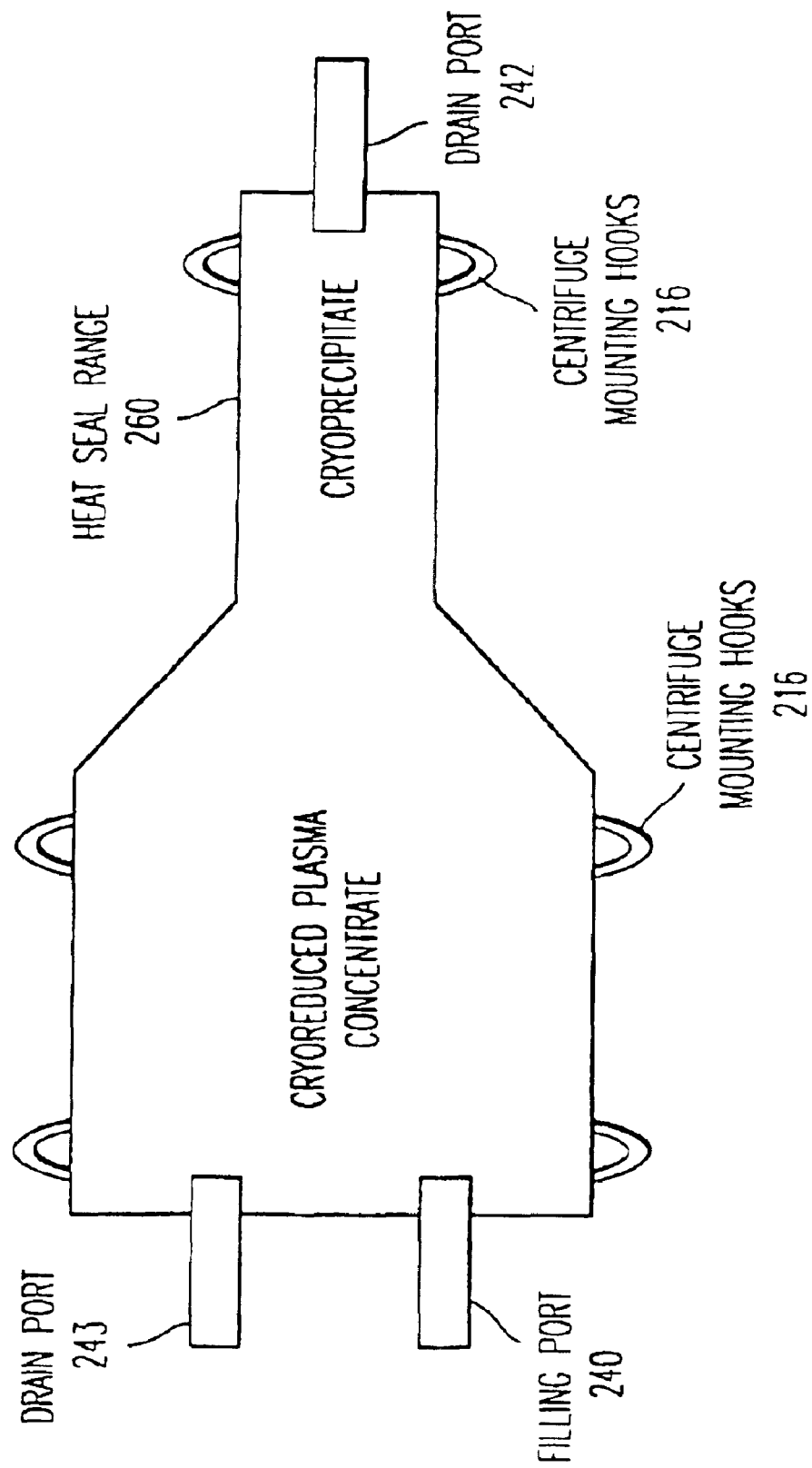
FIG. 4 shows an embodiment of an apparatus for separating and/or purifying materials by cryoprecipitation according to a preferred form of the present invention.

To achieve these desired results in practice, a new system has been developed. The first part of the system is the same as that used for the concentration system discussed above, consisting of the same modules used for heat transfer, ultrasound, control, etc. The only modification is to rotate the processing chamber 90 degrees so that the plasma bag is now held horizontally, rather than vertically The second part of the cryoprecipitator is the container, preferably a disposable bag, itself, as shown in FIG. 4. To avoid activation of the clotting sequence, this bag is made of the same plastics used for conventional plasma bags. Also like conventional bags, access is provided through standard docking ports 240, 242, and 243, which can be accessed through hollow needles or sterile coupling devices.

Unlike conventional bags, however, this bag has its ports at opposite ends. One of these ports 240 is used to fill the bag with plasma concentrate, after which this port is then permanently heat sealed using conventional equipment and practices.

After filling, the bag is then placed into the processing chamber. The cooling process used for concentration is then repeated, but in this case, the process is continued until all of the plasma is frozen. Specifically, there is no ice removal or liquid residual component in this process.

After complete freezing, the bag can be removed and stored in a freezer or processed immediately. Freezer storage ensures that even the most concentrated pockets of material are well frozen and thus may slightly increase the yield. Freezing also allows for transport to a central processing facility, or for processing multiple units after normal collection hours. Given the speed of the overall process, however, most users will probably continue the process without freezer storage.

In either case, the next step is to warm the sample to produce the cryoprecipitate. This warming can be achieved by any of the various water bath immersion, microwave, electrical resistance, etc., techniques already used or tested for plasma processing. The important consideration at this point is to control the temperature to avoid excessive heating; the variation in quality with regard to temperature is well known.

One modification of the heating technique is to use ultrasound on the frozen material, which rapidly warms the material. This technique requires careful control, however, because applying ultrasound to the melt can rapidly overheat the liquid, as well as disrupt the agglomerates.

Another modification is to thaw the material only partially, noting that the cryoprecipitates largely thaw out first due to preferential nucleation. This approach, however, improves the cryoprecipitate at the expense of the quality of the cryoreduced material, and is thus appropriate only under limited conditions.

In any case, after warming, the bag is then placed in a centrifuge with the narrow tip pointing outward. Hooks 216 on the bag are matched to centrifuge, thus ensuring that the bag is mounted properly and that it stays in the proper location. Activation of the centrifuge (5,000 g for 15 min at 2° C. or similar values will suffice) then forces the cryoprecipitate into the neck of the bag. The cryoreduced plasma thus occupies the remainder of the bag volume.

After centrifugation, the boundary between the white cryoprecipitate and the yellow residual material is quite apparent to either the human eye or an automated scanner. The embodiment shown in FIG. 4 contains a heat seal range 260. Placing a heat seal across the bag at this point thus isolates the fractions.

At this point, the isolated materials are then optionally severed at the seal for immediate use or subsequent processing. For example, a blood bank may require the cryoprecipitate locally, but have no need for the cryoreduced material, which would then be sent to a fractionation facility. Alternatively, both components can be left joined together, which makes tracking easier, and also facilitates recalls if testing shows infectious agents.

e. Pressure Enhancement

The above technology is based on the principles of conventional cryoprecipitation, in which freezing causes the solutes to be concentrated and then held in close contact for sufficiently long times to agglomerate. On the other hand, the concentrated plasma from the earlier process is already at or near the eutectic limit, so only slight additional concentration is possible. Thus, all that remains is sufficient pressures for sufficient times.

To achieve these conditions, conventional high pressure vessels can be used. When operated in the range of 45 to 60 kpsi, these vessels will not only induce precipitation, but they will also inactivate enveloped viruses. Note that the current efforts to achieve viral inactivation alone do not describe any precipitation effects because only normal, non-concentrated plasma has been studied; the proteins in this plasma are too dilute to agglomerate.

The main advantage of the pressure process is that it would thus eliminate the 10% or greater freeze damage associated with conventional techniques. The disadvantage is the expense and time involved with the pressure vessel, although these concerns could be partially offset if some viral decontamination is also provided.

Finally, a mixed process could also be used, with pressure providing nuclei for a subsequent step. This approach would provide the advantages of multiple freeze/thaw cycles, but without the associated freeze damage to the proteins.

Chromatography

As explained above, the underlying principle in chromatography is that different materials diffuse through different media at different rates. These differences in rates thus provide a means of separating the various components of complicated mixtures. Such separations are commonly used to identify individual components, such as toxins or other unknowns, and to prepare commercially valuable fractions of known mixtures, such as blood plasma.

a. Use of Plasma Concentrate as Starting Material

In another embodiment, the present invention provides a method for processing a blood plasma concentrate, which comprises:

(a) eluting said blood plasma concentrate through a stationary phase.

For human plasma, the use of a well-prepared concentrate as a starting material provides many advantages. The first such advantage is that the concentrate will yield improved resolution in any given system due to decreased sample size. This benefit follows immediately from the decreased variation in effective starting location, and improved media contact at this point.

The next advantage of the concentrate as prepared to this point is that the cryoprecipitates are already quite effectively removed. This is important because the cryoprecipitates contain components, such as fibrinogen, that are large and somewhat adhesive in nature. As such, they tend to stick to the chromatography media, and retard the overall flow. In addition, these components also tend to harbor much of any viral contamination that may be in the plasma. Effective cryoprecipitate removal thus provides a product with better separation, in less time, and with less contamination.

b. Ultrasonic Assisted Chromatography

In another embodiment, the present invention provides a method for separating and/or purifying materials, in particular temperature-sensitive materials such as blood plasma, which comprises:

(a) eluting said material through a stationary phase, while supplying ultrasonic energy ultrasonic energy transmission from an external energy source to the material.

Use of a concentrated starting material, however, does not affect the fundamental limits of chromatography. Specifically, even with a concentrate, the process is still long and expensive, particularly for difficult specimens such as plasma proteins.

The solution to this problem is to use ultrasound to assist the flow of the material through and within the chamber. Note that this is not the same as applying pressure or centrifugal force, although such techniques are in and of themselves quite useful in some applications.

Instead, the use of ultrasound fundamentally changes the nature of the flow itself. The most obvious such effect is easily demonstrated by applying ultrasound to a viscous fluid. Even at power levels well below cavitation, the application of ultrasound causes any fluid to flow much more readily, due to an effective decrease in viscosity. In the case of chromatography, ultrasound can thus spread the material rapidly and quickly throughout the chamber, thus eliminating both eddy diffusion and resistance to mass transfer as causes of resolution loss.

On the other hand, this rapid spreading could also cause the material to diffuse more rapidly under the concentration gradient, thereby decreasing the resolution. To prevent this from happening, the ultrasound must be applied so that each local zone reaches equilibrium rapidly. Specifically, it is necessary to eliminate the boundary layer between the fluid and the absorber. Because ultrasound is quite effective in disrupting such layers, zone equilibration thus occurs before bulk diffusion. The net result is that ultrasound thus not only preserves the resolution, but actually sharpens it, even while accelerating the process.

Of course, it is obviously desirable to obtain the maximum possible benefits from this new approach. It is therefore necessary to determine the ideal type of ultrasound to apply and the ideal method of application. As for the desired ultrasound characteristics, the general rules used for the other components of the plasma system are appropriate here. Specifically, keep the power low enough to prevent the cavitation that would otherwise damage the proteins. Frequency is a relatively minor concern, mainly governed by the availability of commercial equipment. It is important to note in this case, however, that the sound will be on for a long time, so component durability is critical, along with a separate detector to warn of component failure. In addition, the supporting equipment and wave guides must also be strong enough to withstand prolonged use, as well as the variable sweep frequencies and traveling wave reflections required to eliminate nodal dead spots.

The most important consideration, however, is the means of sonification. Specifically, the main options are to either sonify the target material, or to sonify the media. Of these two options, sonification of the media provides better boundary layer break-up and is therefore preferred for most applications. Target material sonification, however, is useful for those cases in which the target material viscosity is high, or for those cases in which the media strongly attenuate ultrasonic waves. A third option, combining the benefits of both approaches, is to sonify both the target material and the media.

In summary, conventional chromatography systems require a careful balance between flow speeds, equilibration, viscosity, relative absorption, etc., but these systems lack a means of controlling the various competing factors. Applying ultrasound provides a means of achieving this control, thereby improving the performance of the overall system.

The ultrasound equipment used and the power and frequency of ultrasonic energy applied in this embodiment are the same as those described above, in the context of the concentration method discussed above.

Suitable stationary and mobile phases to be used in the present chromatography methods are disclosed in U.S. Pat. Nos. 5,833,861 and 5,880,265; Harrison et al, *Thrombosis Research*, vol. 50, pp. 295–305 (1988); Curling, *Methods of Plasma Protein Fractionation*, Academic Press, NY, pp. 77–97, 1980; and Sternberger et al, *Hoppe-Seyler's Z. Physiol. Chem.*, vol. 357, pp. 1003–1005 (1976), all of which are incorporated herein by reference.

In the case of certain materials it may be necessary or advantageous to mix or dissolve the material in one or more mobile phases. In the case of blood plasma or a blood plasma concentrate, the mobile phase is preferably the water contained in the blood plasma or blood plasma concentrate itself.

c. Plasma Applications of Sonified Chromatography

One application of sonified systems is a very rapid preliminary separation. Such separations are useful for plasma and other complex mixtures consisting of a very wide variety of components with significant differences in transport rates. Specifically, plasma proteins have a great variety in molecular weight, shape, and charge distribution. A preliminary separation is thus valuable because it would yield components more similar in nature, which can then be separated more readily in subsequent steps designed for more specific components.

This preliminary step is particularly useful for plasma proteins to exclude contaminants, such as viruses, bacteria, and cells. Because all of these contaminants are quite large, highly efficient removal would be expected. In particular, because recent evidence indicates that Creutzfeldt-Jacob Disease may possibly be spread in plasma products by the inadvertent inclusion of contaminated cells, a preliminary separation may provide the only possible means of decontamination for such agents. In this case, the preliminary separator would be only a short length of conventional absorber; little discrimination is required to separate entire cells, or even cell fragments, from protein molecules.

Although such preliminary separations can be quite useful, the main value in sonification is, of course, the accelerating of the separation of the various non-cryoprecipitating plasma proteins, particularly the immunoglobulins. In this case, any improvements in speed are crucial.

Finally, combining the concentrator with a sonified chromatography system would provide substantial savings over supercritical fluid and affinity chromatography, with applications throughout the separation industry.

d. Typical Configuration

In another embodiment, the present invention provides a chromatographic apparatus, which comprises:

(a) a container suitable for eluting a material through a stationary phase and allowing ultrasonic energy transmission from an external energy source into the material; and (b) an external ultrasonic energy source.

Figure 5:
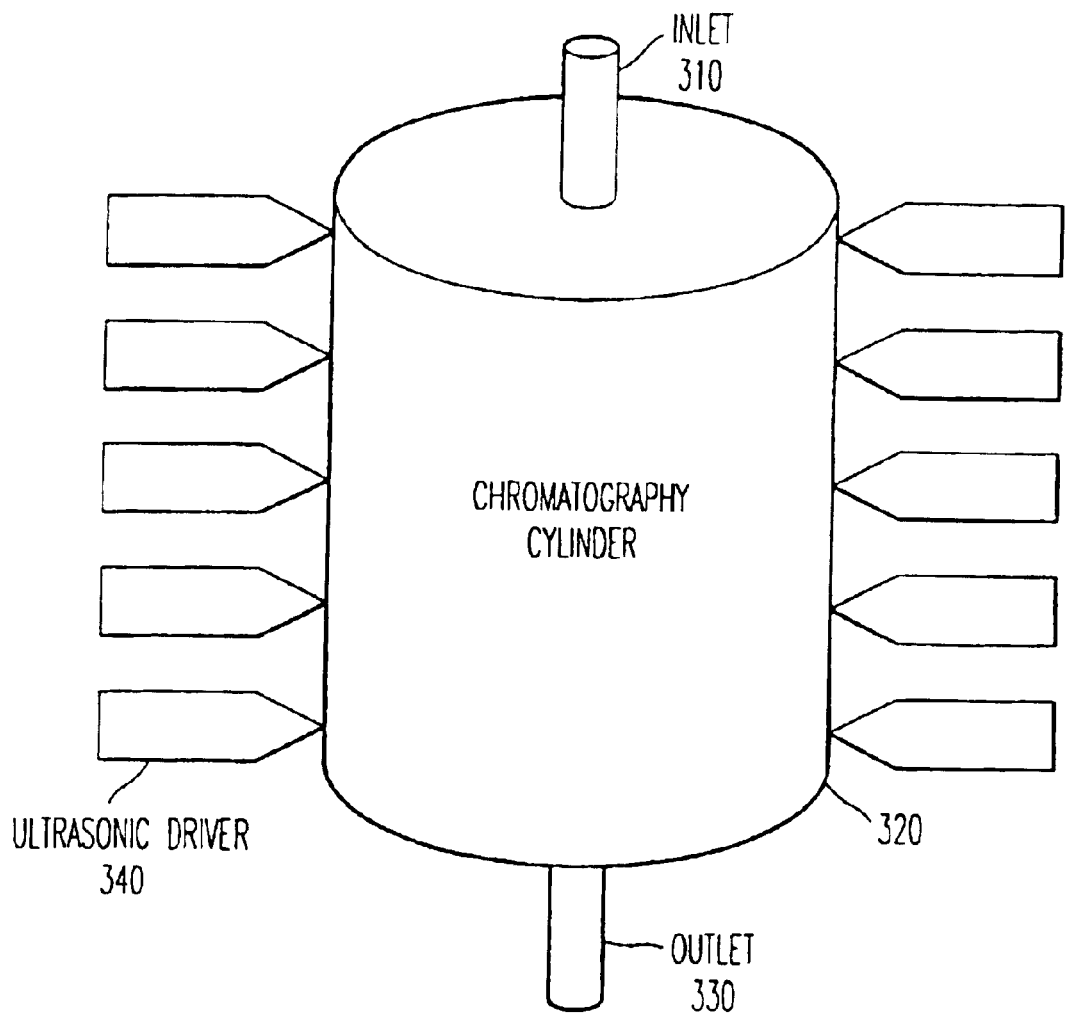
FIG. 5 shows an embodiment of an apparatus for separating and/or purifying materials by chromatography according to a preferred form of the present invention.

A specific embodiment of the present chromatographic apparatus is shown in FIG. 5. In this preferred embodiment, multiple ultrasound sources 340 are used to account for wave attenuation. Note also that although a column geometry is shown, similar arrangements based on the known principles of ultrasound also apply to plates, gels, size exclusion systems, etc. The material to be separated and/or purified is introduced into the inlet 310 and allowed to elute through the stationary phase contained in the cylinder 320. Eluted product is collected at the outlet 330.

In the case of plasma or other pharmaceuticals, the system is also designed for closed operation. In this case, the entire system is sterilized by exposure to gamma or beta radiation, or other standard techniques. In the field, access is obtained through sterile ports. The entire system is made of components that do not induce clotting, and can be incinerated after use.

EXAMPLES

By way of illustration, and without limitation to the specific embodiments described, the present invention will be further illustrated by way of the following example. Approximately 200 mL of human plasma is introduced into the treatment chamber 110 of a concentration container 100, substantially as described above, through the material inlet fitting 140. The concentration container 100 is filled to an initial level 124, just below the collection port 122. The concentration container 100 or a supporting frame (not shown) is gripped at anchor points 116 by a robot arm having vacuum assisted grippers for engaging the concentration container 100, and is transferred to a position between two cooling plates 22a and 22b. The cooling plates 22a, 22b are closed by movable frame arms, to engage the movable chamber walls 112, 114 of the treatment chamber 110. Vacuum assisted grippers on the cooling plates 22a, 22b hold the walls 112, 114 in place. The cooling plates 22a, 22b are movable toward and away from one another in order to maintain the desired spacing therebetween. In this manner, the heat transfer from the plasma may be controlled by adjusting the volume of plasma between the cooling plates 22a, 22b. The plasma may also be circulated within the container 100 by movement of the cooling plates 22a, 22b, for thermal and material mixing.

The refrigeration unit 24 pumps refrigerant through the refrigerant conduits 26 to cool the cooling plates 22a, 22b and absorb heat from the plasma through the walls 112, 114 of the container 100. At approximately the same time, the ultrasonic transducer 42 of the ultrasonic energy source 40 is activated to apply ultrasonic energy to the plasma. As the plasma is cooled to approximately 0° C. or below, water in the plasma will freeze at ultrasonically-induced nucleation sites within the treatment chamber to form ice crystals. The ultrasonic excitation of the plasma serves not only to induce nucleation of ice crystals, but also prevents formation of dendrites on the ice crystals that otherwise would entrap non-water components of the plasma in the crystalline matrix. The ultrasonic excitation of the plasma also increases the rate of heat transfer within the plasma, thereby enabling faster cooling, and reduces the viscosity of the plasma, thereby allowing the ice crystals to more readily float to the top of the treatment chamber 110. The ultrasonic excitation also results in crystal formation throughout the entire volume of the plasma in the treatment chamber 110, rather than building up a layer of ice at the surface adjacent the cooling plates 22a, 22b. The ultrasonic excitation also enhances the rate of heat transfer from the plasma.

The ice crystals collect at the top of the treatment chamber 110, and are transferred to the collection chamber 120 through the collection port 122. Sensors 150 in the treatment chamber 110 monitor the concentration of the plasma remaining in the treatment chamber 110 as ice crystals are removed. Upon reaching a predetermined concentration, the cooling plates are disengaged from the concentrating container 100, and the ultrasonic energy source 40 is deactivated.

The concentrated plasma product is then transferred from the treatment chamber 110, through the product transfer port 132 and associated filter 134, into the product chamber 130. The concentrated plasma product can then be removed from the product chamber 130 through the product collection fitting 142, for use, storage or additional processing. The process can be repeated until the desired concentration is achieved.

While the invention has been described in its preferred forms, it will be readily apparent to those of ordinary skill in the art that many additions, modifications and deletions can be made thereto without departing from the spirit and scope of the invention.

What is claimed is:

1. A method of concentrating a material comprising at least a first component and a second component, to form a product having an increased concentration of one of said first and second components, said method comprising:

(a) removing salts from said material;

(b) cooling at least a portion of said material to a temperature at or below the melting point of said material, said portion containing said first component in liquid phase;

(c) applying ultrasonic energy to at least said cooled portion of said material to form a solid phase comprising said first component; and (d) collecting said solid phase, wherein said material comprises at least one member selected from the group consisting of blood plasma, a blood plasma concentrate, and mixtures thereof.

2. The method of claim 1, wherein said steps of cooling and applying ultrasonic energy comprise passing said material adjacent a first sonified cooling plate.

3. The method of claim 2, wherein said steps of cooling and applying ultrasonic energy comprise passing said material between first and second cooling plates, at least said first cooling plate comprising a sonified cooling plate.

4. The method of claim 3, wherein said first and second cooling plates each comprise sonified cooling plates.

5. The method of claim 1, wherein said cooling step comprises cooling at least a portion of said material to below 0° C.

6. The method of claim 1, further comprising depositing said material into a thin walled flexible container, and wherein said steps of cooling and applying ultrasonic energy are carried out across a wall portion of said flexible container.

7. The method of claim 1, wherein said step of collecting said solid phase comprises centrifuging the material containing said solid phase.

8. The method of claim 1, wherein said step of removing salts from said material comprises effecting a transfer of salts across a dialysis membrane.

9. The method of claim 1, further comprising monitoring the concentration of at least one component in said product.

10. The method of claim 9, wherein said step of monitoring the concentration comprises sensing the resistivity of said product.

11. The method of claim 9, wherein said step of monitoring the concentration comprises sensing the viscosity or optical properties of said product.

12. The method of claim 1, further comprising testing for the presence of one or more contaminants in said product.

13. The method of claim 1, wherein said material comprises blood plasma.

14. The method of claim 1, wherein said material comprises a blood plasma concentrate.

15. The method of claim 1, wherein said material is cooled to a temperature of −0.5° C. to −1° C.

16. The method of claim 2, wherein said material is initially cooled to a temperature of −1° C. and then further cooled to a lower temperature.

17. The method of claim 2, wherein said material is cooled to a temperature of −0.5° C. to −5° C.

18. The method of claim 2, wherein said material comprises blood plasma.

19. The method of claim 2, wherein said material comprises a blood plasma concentrate.

20. The method of claim 2, wherein said material is cooled to a temperature of −0.5° C. to −1° C.

21. The method of claim 2, wherein said material is initially cooled to a temperature of −1° C. and then further cooled to a lower temperature.

22. The method of claim 2, wherein said material is cooled to a temperature of −0.5° C. to −5° C.

23. The method of claim 3, wherein said material comprises blood plasma.

24. The method of claim 3, wherein said material comprises a blood plasma concentrate.

25. The method of claim 3, wherein said material is cooled to a temperature of −0.5° C. to −1° C.

26. The method of claim 3, wherein said material is initially cooled to a temperature of −1° C. and then further cooled to a lower temperature.

27. The method of claim 3, wherein said material is cooled to a temperature of −0.5° C. to −5° C.

28. The method of claim 4, wherein said material comprises blood plasma.

29. The method of claim 4, wherein said material comprises a blood plasma concentrate.

30. The method of claim 4, wherein said material is cooled to a temperature of −0.5° C. to −1° C.

31. The method of claim 4, wherein said material is initially cooled to a temperature of −1° C. and then further cooled to a lower temperature.

32. The method of claim 4, wherein said material is cooled to a temperature of −0.5° C. to −5° C.

33. The method of claim 8, wherein said material comprises blood plasma.

34. The method of claim 8, wherein said material comprises a blood plasma concentrate.

35. The method of claim 8, wherein said material is cooled to a temperature of −0.5° C. to −1° C.

36. The method of claim 8, wherein said material is initially cooled to a temperature of −1° C. and then further cooled to a lower temperature.

37. The method of claim 8, wherein said material is cooled to a temperature of −0.5° C. to −5° C.

* * * * *

UNITED STATES PATENT AND TRADEMARK OFFICE
CERTIFICATE OF CORRECTION

PATENT NO. : 6,808,638 B1  
DATED : October 26, 2004  
INVENTOR(S) : Howard E. Purdum Page 1 of 1

It is certified that error appears in the above-identified patent and that said Letters Patent is hereby corrected as shown below:

<u>Title page,</u>  
Item [57], ABSTRACT,  
Line 13, "cryoprecipilation" should read -- cryoprecipitation --.

<u>Column 2,</u>  
Line 2, "in organic" should read -- inorganic --.

<u>Column 10,</u>  
Line 20, "point At" should read -- point. At --.

<u>Column 13,</u>  
Line 41, "clement" should read -- element --.

<u>Column 20,</u>  
Line 31, "beat" should read -- heat --.  
Line 61, ".some" should read -- some --.

Signed and Sealed this

Seventeenth Day of May, 2005

JON W. DUDAS  
*Director of the United States Patent and Trademark Office*